United States Patent [19]

Hoskin et al.

[11] Patent Number: 5,156,214

[45] Date of Patent: Oct. 20, 1992

[54] METHOD FOR IMPARTING SELECTIVITY TO POLYMERIC GEL SYSTEMS

[75] Inventors: Dennis H. Hoskin, Lawrenceville, N.J.; Thomas R. Sifferman, Plano, Tex.

[73] Assignee: Mobil Oil Corporation, Fairfax, Va.

[21] Appl. No.: 628,042

[22] Filed: Dec. 17, 1990

[51] Int. Cl.$^5$ .................. E21B 33/138; E21B 43/22; E21B 43/24

[52] U.S. Cl. .................. 166/270; 166/272; 166/273; 166/295; 166/300; 523/130

[58] Field of Search .............. 166/246, 270, 273, 295; 166/300; 252/8.554; 523/130

[56] References Cited

U.S. PATENT DOCUMENTS

| | | | |
|---|---|---|---|
| 3,305,016 | 2/1967 | Lindblom et al. | |
| 3,557,562 | 1/1971 | McLaughlin, Jr. et al. | 166/295 |
| 3,810,882 | 5/1974 | Browning et al. | |
| 3,908,760 | 9/1975 | Clampitt et al. | 166/246 |
| 3,918,521 | 11/1975 | Snavely, Jr. et al. | 166/272 |
| 4,009,755 | 3/1977 | Sandiford | 166/270 |
| 4,069,869 | 1/1978 | Sandiford | 166/270 |
| 4,157,322 | 6/1979 | Colegrove | 166/270 |
| 4,309,523 | 1/1982 | Engelhardt et al. | 526/240 |
| 4,413,680 | 11/1983 | Sandiford et al. | 166/270 |
| 4,461,351 | 7/1984 | Falk | 166/295 |
| 4,479,894 | 10/1984 | Chen et al. | 252/8.554 |
| 4,489,783 | 12/1984 | Shu | 166/272 |
| 4,565,249 | 1/1986 | Pebdani et al. | 166/303 |
| 4,606,407 | 8/1986 | Shu | 166/270 |
| 4,644,020 | 2/1987 | Stahl | 523/130 |
| 4,653,585 | 3/1987 | Chung et al. | 166/275 |
| 4,658,898 | 4/1987 | Paul et al. | 166/270 |
| 4,706,754 | 11/1987 | Smith | 166/295 |
| 4,716,966 | 1/1988 | Shu | 166/295 |
| 4,758,356 | 7/1988 | Downs | 166/246 |
| 4,776,398 | 10/1988 | Chu et al. | 166/274 |
| 4,782,901 | 11/1988 | Phelps et al. | 166/270 |
| 4,787,451 | 11/1988 | Mitchell | 166/270 |
| 4,793,416 | 12/1988 | Mitchell | 166/266 |
| 4,810,732 | 3/1989 | Shu | 523/130 |
| 4,834,180 | 5/1989 | Shu | 166/270 |
| 4,856,586 | 8/1989 | Phelps et al. | 166/270 |
| 4,901,795 | 2/1990 | Phelps et al. | 166/270 |
| 4,903,767 | 2/1990 | Shu et al. | 166/270 |
| 4,964,461 | 10/1990 | Shu | 166/295 X |
| 4,991,652 | 2/1991 | Hoskin et al. | 166/270 |
| 5,002,980 | 3/1991 | Phelps et al. | 523/130 |

*Primary Examiner*—George A. Suchfield
*Attorney, Agent, or Firm*—Alexander J. McKillop; Charles J. Speciale; Michael J. Mlotkowski

[57] ABSTRACT

A method for imparting selectivity to an in-situ gel-forming composition for placement within a subterranean oil-bearing formation having relatively high permeability zones and relatively low permeability zones, comprising the steps of: preparing an aqueous-based mixture, the mixture comprising: a first stage gel-forming composition in an amount effective to selectively enter the relatively high permeability zones of the formation, the first stage composition including a heteropolysaccharide prepared by growing Xanthomonas campestris NCIB 11854 in an aqueous nutrient medium by aerobic fermentation and recovering the heteropolysaccharide and a crosslinking agent for the heteropolysaccharide; and at least one second stage in-situ gel-forming composition comprising a water-dispersible polymer and a crosslinking agent for the water-dispersible polymer in an amount effective to form a stable gel; and gelling the first stage gel-forming composition ex-situ by reacting the Xanthomonas campestris NCIB 11854 heteropolysaccharide with the crosslinking agent for the heteropolysaccharide. The mixture so prepared exhibits greater selectivity than would a like mixture in the absence of the first stage selective gel-forming composition.

20 Claims, No Drawings

METHOD FOR IMPARTING SELECTIVITY TO POLYMERIC GEL SYSTEMS

FIELD OF THE INVENTION

This invention relates to the use of polymeric gels for profile control to enable increased amounts of reservoir fluids to be recovered from a subterranean formation.

BACKGROUND OF THE INVENTION

In the production of oil from subterranean formations, only a small fraction of the total formation oil can usually be recovered through the use of primary recovery methods. As those skilled in the art recognize, a primary recovery method is one which utilizes only the natural forces present in the reservoir. To recover additional oil, a variety of supplemental production techniques have been developed. In these supplemental techniques, commonly referred to as secondary or tertiary recovery operations, a fluid is introduced into the oil-bearing formation in order to displace oil to a production system comprising one or more production wells. The displacing or "drive" fluid may be an aqueous liquid such as brine or fresh water, a gas such as carbon dioxide, steam or dense-phase carbon dioxide, an oil-miscible liquid such as butane, or an oil and water-miscible liquid such as an alcohol. Often, the most cost-effective and desirable secondary recovery methods involve the injection of steam. In practice, a number of injection and production wells will be used in a given field arranged in conventional patterns such as a line drive, a five spot or inverted five spot, or a seven spot or inverted seven spot.

In the use of the various flooding techniques, it has become a common expedient to add various polymeric thickening agents to the drive fluid to increase its viscosity to a point where it approaches that of the oil to be displaced, thus improving the displacement of oil from the formation. The polymers used for this purpose are often said to be used for "mobility" control.

Another problem encountered is that certain injected drive fluids may be much lighter than the reservoir fluids and thus separate by gravity, rising toward the top of the flowing region and resulting in the bypassing of the lower regions. This phenomena is known as gravity override.

Also encountered in the use of the various flooding techniques is a situation caused by the fact that different regions or strata often have different permeabilities. When this situation is encountered, the drive fluid may preferentially enter regions of higher permeability due to their lower resistance to flow rather than the regions of low permeability where significant volumes of oil often reside.

It therefore is often desirable to plug the regions of high permeability, or "thief" zones, either partly or entirely, so as to divert the drive fluid into regions of lower permeability. The mechanical isolation of these thief zones has been tried but vertical communication among reservoir strata often renders this method ineffective. Physical plugging of the high permeability regions by cements and solid slurries has also been tried with varying degrees of success; however, these techniques have the drawback that still-productive sites may be permanently closed.

As a result of these earlier efforts, the desirability of designing a slug capable of sealing off the most permeable layers so that the drive fluid would be diverted to the underswept, "tighter" regions of the reservoir, became evident. This led to the use of oil/water emulsions, as well as gels and polymers for controlling the permeability of the formations. This process is frequently referred to as "flood conformance" or "profile control", a reference to the control of the vertical permeability profile of the reservoir. Profile control agents which have been proposed include oil/water emulsions and gels, e.g., lignosulfate gels and polymeric gels, with polymeric gels being the most extensively applied in recent years.

Among the polymers so far examined for improving flood conformance are polyacrylamides, polysaccharides, celluloses, furfural-alcohol and acrylic/epoxy resins, silicates and polyisocyanurates. A major part of this work has been conducted with the polyacrylamides, both in their normal, non-crosslinked form, as well as in the form of metal complexes, as described, for example, in U.S. Pat. Nos. 4,009,755, 4,069,869 and 4,413,680. In either form, the beneficial effects derived from these polyacrylamides seem to dissipate rapidly due to shear degradation during injection and sensitivity to reservoir brines, low pH and high temperature. To overcome these problems and to achieve deeper polymer penetration into the reservoir, dilute solutions of these polymers have sometimes been injected first and then complexed in-situ.

Another group of polymeric thickeners which has received considerable attention for use in improving flooding are polysaccharides, particularly those produced by the action of bacteria of the genus Xanthomonas on carbohydrates. For example, U.S. Pat. Nos. 3,757,863 and 3,383,307 disclose a process for mobility control by the use of polysaccharides.

U.S. Pat. Nos. 3,741,307, 4,009,755 and 4,069,869 disclose the use of polysaccharides in the control of reservoir permeability. U.S. Pat. No. 4,413,680 describes the use of crosslinked polysaccharides for selective permeability control in oil reservoirs.

U.S. Pat. No. 3,908,760 describes a polymer water-flooding process in which a gelled, water-soluble Xanthomonas campestris polysaccharide is injected into a stratified reservoir to form a slug, band or front of gel extending vertically across both high permeability and low permeability strata. This patent also suggests the use of complexed polysaccharides to block natural or man-made fractures in formations.

Another type of polysaccharide which has been experimented with in the area of profile control is the non-xanthan, heteropolysaccharide S-130. S-130 is a member of a group of welan gums and is produced by fermentation with a microorganism of the genus Alcaligenes. Another welan gum heteropolysaccharide, known as S-194, is also produced by fermentation with a microorganism of the genus Alcaligenes. A notable characteristic of the heteropolysaccharide S-130 is that it develops a high viscosity in saline waters. This is particularly so in brines which contain divalent cations such as $Ca^{2+}$ and $Mg^{2+}$ or monovalent cations such as $Na^+$ and $K^+$. U.S. Pat. No. 4,658,898 discloses the use of welan gum S-130 in saline waters. Crosslinking with trivalent cations, such as chromium, aluminum, zirconium and iron is also disclosed. Additionally, crosslinking with organic compounds containing at least two positively charged nitrogen atoms is disclosed in U.S. Pat. No. 4,658,898; while Ser. No. 283,399, filed on Dec.

12, 1988, discloses welan gums crosslinked with phenolic resins or mixtures of phenols and aldehydes.

The use of various block copolymers for mobility control in waterflooding operations is described in U.S. Pat. Nos. 4,110,232, 4,120,801 and 4,222,881. Chung et al., U.S. Pat. No. 4,653,585, disclose the use of block copolymers, which may be crosslinked with polyvalent metal ions, for use as permeability control agents in enhanced oil recovery applications.

While a number of the different compositions discussed have been proposed for permeability control, some of these compositions may be unsuitable for use as permeability control agents under certain circumstances. For example, the polymers of Chung et al, may not be effectively crosslinked with polyvalent metal ions under all conditions encountered in the enhanced oil recovery applications, e.g., in acidic conditions commonly found in carbon dioxide ($CO_2$) flooding operations. Polyacrylamides display instability in the presence of high brine concentration at temperatures over 70° C. Xanthan gums are very brine tolerant but display thermal instability, even at temperatures below 60° C. Still, other polymers are unsuitable as permeability control agents when used in conjunction with steam flooding operations. This is due to the fact that they lose their structural integrity at the high temperatures generated during such operations. In view of the severe conditions which include both high brine concentrations, elevated temperatures or both, so-called hostile environment polymers, such as those marketed by the Phillips Petroleum Company of Bartlesville, Okla. and the Hoechst Celanese Corporation of Somerville, N.J. have been developed.

Basic to the problem of diverting displacing fluid with polymeric gels is the necessity of placing the polymer where it is needed, i.e. selective penetration into the high permeability zone. In general, there are two ways to deliver polymer gels into the formation. The first method is to inject gelled polymer into the formation. This is the so-called surface gelation method. The advantage of this method is that the polymer will enter the loose, more highly permeable zone in preference to the tighter, low permeability zone, due to the high viscosity of the gelled polymer. Another advantage is that gelation is ensured since the gel is prepared at the surface. However, depending upon the characteristics of the polymer selected, it is possible that the polymer gel will not penetrate far enough to block a high pore volume of the designated zone at low pumping pressures and low pumping rates. This is particularly so when a high pressure drop is experienced within a small radius of the injection wellbore. While increasing pumping pressure and/or flow rate could serve to diminish this problem, there are increased risks of facturing the reservoir and degrading the gel structure by high shear forces, as those skilled in the art will readily understand.

The second method is the so-called in-situ gelation method, in which separate slugs of polymer, one containing an inactive crosslinker (such as dichromate), the other, an activator (reducing agents such as thiourea and bisulfite), are injected sequentially into the reservoir. Gelation occurs when the two parts meet in the reservoir. With this method, shear degradation is reduced and the penetration of polymer is improved because of the lower viscosity of the ungelled polymer. However, because the solution will generally possess a low viscosity, the non-crosslinked polymer slug can also enter the tight zone and cause its blockage, defeating the purpose of the profile control treatment. A further disadvantage of this method is that there is no guarantee that the two slugs of treatment will be placed in the same area and mix well enough to form a strong gel.

There are also many other gel systems that are formed in-situ. One system disclosed in U.S. Pat. No. 3,557,562 contains acrylamide monomer, methylene-bis-acrylamide as an organic crosslinker, and a free radical initiator. This system undergoes polymerization in the formation to give a polyacrylamide crosslinked with methylene-bis-acrylamide. However, the viscosity of the solution when injected is like that of water. Unless mechanical isolation is used, these solutions are quite capable of penetrating low permeability, oil bearing zones. Another form of in-situ gelation involves the injection of polyacrylamide containing chromium in the form of chromate. A reducing agent such as thiourea or sodium thiosulfate is also injected to reduce the chromate in-situ to $Cr^{+3}$, a species capable of crosslinking hydrolyzed polyacrylamide. Even though the polyacrylamide solution has a viscosity greater than water, it is not capable of the selectivity of a preformed gel. Thus, polyacrylamides crosslinked with chromium in-situ can also go into low permeability zones. It is not useful to crosslink polyacrylamides above ground and inject them as gels, because polyacrylamide gels undergo shear degradation.

To improve upon the aforementioned polymer delivery methods, several solutions have been proposed. U.S. Pat. No. 4,606,407 discloses a method in which polymers are gelled in a controlled manner through the use of rapid and delayed polyvalent metal gelling agents. The gelling agents disclosed are capable of forming two or more coordinate bonds with donor atoms in the polymers. Polymers disclosed within U.S. Pat. No. 4,606,407 as having the requisite donor atoms for forming coordinate linkages include polyacrylamides, other acrylic polymers and polysaccharides. In the practice of the method of U.S. Pat. No. 4,606,407, a solution or dispersion of the polymer is first lightly gelled on the surface through the use of the rapid polyvalent metal crosslinking agent. The delayed polyvalent metal crosslinking agent is also added to the solution or dispersion so as to effect complete gelation at a later period of time when the desired depth of penetration has been achieved. U.S. Pat. No. 4,606,407 is hereby incorporated by reference in its entirety for all that it discloses.

Another solution was proposed in U.S. Pat. No. 4,901,795, the contents of which are hereby incorporated by reference in their entirety. U.S. Pat. No. 4,901,795 discloses a two stage gel system employing a xanthan-based first stage gel for ex-situ gelation and a second stage gel-forming composition which gels in-situ. Selective placement of this two-stage system is effected through the use of a Cr crosslinked xanthan gel as the first stage system. As is known in the art, xanthan heteropolysaccharides may be crosslinked with metal ions such as $Cr^{+3}$ above ground to yield gels. These gels are shear stable and shear thinning and can be injected into the formation where they then reheal. Due to this unique rheological property, such gels selectively enter high permeability zones. However, as is well known, xanthan-Cr gels have poor thermal stability at temperatures greater than about 140° F.

In the practice of the invention of U.S. Pat. No. 4,901,795, a first gel is placed into an aqueous solution in an amount sufficient to enter the pores of a formation's more permeable zones. Such a gel, as mentioned, forms ex-situ and is shear thinning. A second, in-situ-forming gel is combined with the first gel, the second gel substantially more resistant to formation conditions than the first gel. After mixing and permitting the first gel to gel ex-situ, the composition containing ungelled in-situ gel components is directed into the formation's more permeable zones by the selective penetration of the ex-situ gel, where it reheals. Thereafter, heat from the formation causes the in-situ gel to firm-up and form a solid gel which is substantially more resistant to formation conditions than the first gel.

While the two-stage gel system of U.S. Pat. No. 4,901,795 provides a useful solution to the gel selectivity problem, it has a rather limited range of pH values within which first stage gelation can occur. This is due to the fact that the gelation of the majority of xanthan gum heteropolysaccharides, including the heteropolysaccharide of the preferred embodiment of U.S. Pat. No. 4,901,795, is pH limited.

Therefore, what is needed is a method in which a selective ex-situ gel composition capable of gelling over a broad range of pH conditions can be combined with an in-situ gel composition so as to obtain greater selectivity in closing a zone of greater permeability in a formation while forming a gel having substantially better qualities to withstand formation conditions.

SUMMARY OF THE INVENTION

Accordingly, in order to obviate the above-described limitations and disadvantages, the present invention provides a method for imparting selectivity to an in-situ gel-forming composition for placement within a subterranean oil-bearing formation having relatively high permeability zones and relatively low permeability zones, comprising the steps of: preparing an aqueous-based mixture, the mixture comprising: a first stage gel-forming composition in an amount effective to selectively enter the relatively high permeability zones of the formation, the first stage composition including a heteropolysaccharide prepared by growing Xanthomonas campestris NCIB 11854 in an aqueous nutrient medium by aerobic fermentation and recovering the heteropolysaccharide and a crosslinking agent for the heteropolysaocharide; and at least one second stage in-situ gel-forming composition comprising a water-dispersible polymer and a crosslinking agent for the water-dispersible polymer in an amount effective to form a stable gel; and gelling the first stage gel-forming composition ex-situ by reacting the Xanthomonas campestris NCIB 11854 heteropolysaccharide with the crosslinking agent for the heteropolysaccharide. The mixture so prepared exhibits greater selectivity than would a like mixture in the absence of the first stage selective gel-forming composition.

It is therefore an object of this invention to provide a gel system where one gel can selectively enter a high permeability zone and reheal while transporting a substantially thinner nonselective gel into the high permeability zone.

It is another object of this invention to keep a thinner in-situ gel from entering a zone of lesser permeability.

It is yet another object of this invention to place nonselective gel components into a formation's zone of greater permeability where they can form a gel, in-situ, which is substantially more resistant to formation conditions.

It is still another object of this invention to place a nonselective gel into a high permeability zone without utilization of mechanical isolation.

It is yet still a further object of this invention to provide a gel system which is capable of gelling over a broad range of pH conditions.

It is yet still further object of this invention to deliver a gel system into a more permeable zone of a formation which is effective under the conditions encountered during high temperature waterflooding and $CO_2$ flooding.

Other objects and the several advantages of the present invention will become apparent to those skilled in the art upon a reading of the specification and the claims appended thereto.

DETAILED DESCRIPTION OF THE INVENTION

The present invention is predicated on the discovery that a particular Xanthomonas heteropolysaccharide, prepared from Xanthomonas campestris NCIB 11854 in accordance with the process disclosed in U.S. Pat. No. 4,758,356, is capable of gelling over a much broader pH range, when crosslinked with the agents disclosed hereinbelow. The ability of this Xanthomonas heteropolysaccharide to gel over a broad pH range is particularly advantageous in the practice of the present invention wherein a two-stage gel system including an ex-situ-forming first stage gel comprising the crosslinked Xanthomonas campestris heteropolysaccharide and an in-situ-forming second stage gel are combined in one system for the purpose of selectively delivering the in-situ gel to a more permeable zone of an oil-bearing subterranean formation. As will become apparent, because the in-situ gel system can be selected to have a pH-dependent gelation rate, the period of time required for the in-situ gel system to form a gel can be selected by adjusting the initial pH of the overall composition at the time of its formation. The broader the pH range over which the first stage ex-situ-forming gel is capable of gelling, the more latitude provided for tailoring the gelation rate of the in-situ-forming gel system. U.S. Pat. No. 4,758,356 is hereby incorporated by reference for all that it discloses.

By the inclusion of an ex-situ-forming gel and an in-situ-forming gel into one system a nonselective in-situ gel can be selectively delivered into a target zone of an oil-bearing subterranean formation for subsequent gelation. As may be evident, in the preparation of this two-stage system, two functionally different gels are utilized. One gel, the ex-situ-forming first stage gel, comprising the aforementioned crosslinked Xanthomonas campestris heteropolysaccharide is utilized to obtain selectivity so that the combined gel system can enter zones of greater permeability in a formation. Another gel, the in-situ-forming second stage gel, is used to obtain increased rigidity and better temperature stability. Utilization of the combined system permits, in one sequence to enter a more permeable zone of the formation. In another sequence, the combined system propagates a desired distance into a formation. Once the system has propagated to the desired distance into the formation, it forms a rigid gel having substantially better temperature stability.

The two-stage gel system of the present invention is injected into the formation, in the usual case, through an injection well which extends from the surface of the earth into the formation. A production well is situated on a horizontal distance or offset from the injection well so that, once the gel system has been placed in the formation to control the permeability and the flooding operation begun in the normal manner by injecting the flooding fluid, such as water, carbon dioxide, etc., through the injection well, recovery of the oil displaced by the flooding fluid can be made through the production well. As can be appreciated by those skilled in the art, a profile control treatment using the two-stage gel system of the present invention can also be performed by injection of the system through a production well, when desired.

Any water-soluble or water-dispersible polymer capable of forming temperature stable aqueous gels, in-situ, through the use of a crosslinking agent for that polymer, is envisioned for use as the second stage gel of the present invention. The polymer which is used to produce the desired gel may be of natural or synthetic origin. Suitable polymers include acrylic polymers, e.g. polyacrylic acid, polyacrylic acid esters, polyacrylamide, polymethacrylic acid, polymethacrylic acid esters, copolymers of unsaturated carboxylic acids, such as acrylic acid or methacrylic acid with olefins such as ethylene, propylene, and butylene, vinyl polymers such as polyvinyl acetate and polyvinyl alcohol, polymers of unsaturated dibasic acids and anhydrides such as maleic anhydride, and their copolymers with other monomers such as ethylene, propylene, styrene and methylstyrene. Other exemplary polymers are described in U.S. Pat. No. 3,208,518, which is hereby incorporated by reference for such details.

Preferred polymers for use in the second stage gel-forming system include the various polyacrylamides and related polymers which are either water-soluble or water-dispersible and which can be used in an aqueous medium with the gelling agents described herein to yield an aqueous gel. These can include the various substantially linear homopolymers and copolymers of acrylamide and methacrylamide. By substantially linear is meant that the polymers are substantially free of crosslinking between the polymer chains. The polymers can have up to about 50 percent of the carboxamide groups hydrolyzed to carboxyl groups. However, as the degree of hydrolysis increases, the polymers often become more difficult to disperse in brines, especially hard brines. As used herein, unless otherwise specified, the term "hydrolyzed" includes modified polymers wherein the carboxyl groups are in the acid form and also such polymers wherein the carboxyl groups are in the salt form, provided such salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Examples of copolymers which can be used for the in-situ-forming second stage gel of the present invention include water-dispersible copolymers resulting from the polymerization of acrylamide or methacrylamide with an ethylenically unsaturated monomer. It is desirable that sufficient acrylamide or methacrylamide be present in the monomer mixture to impart to the resulting copolymer water-dispersible properties. Any suitable ratio of monomers meeting this condition can be used. Under proper conditions of use, examples of suitable ethylenically unsaturated monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl-substituted cationic quaternary ammonium compounds, and the like. Various methods are known in the art for preparing said copolymers. For example, see U.S. Pat. Nos. 2,625,529, 2,740,522, 2,727,557, 2,831,841, and 2,909,508. These copolymers can be used in the hydrolyzed form, as discussed above for the homopolymers.

A group of copolymers useful in forming the second stage gel system of the present invention are the copolymers of acrylamide or methacrylamide and a monomer such as the well known 2-acrylamido-2-methyl-propanesulfonic acid (AMPS®) monomer. (AMPS® is the registered trademark of the Lubrizol Corporation of Cleveland, Ohio.) Useful monomers, such as the AMPS® monomer, and methods for their preparation are described in U.S. Pat. Nos. 3,507,707 and 3,768,565, the disclosures of which are incorporated by reference. The AMPS® monomer is commercially available from the Lubrizol Corporation. The alkali metal salts, such as sodium 2-acrylamido-2-methylpropane sulfonate are also useful in the practice of this invention. These are also readily available.

Copolymers of acrylamide and the AMPS® monomer, and/or its sodium salt, are known and useful in the practice of this invention. For an example of such a copolymer, see the above-mentioned U.S. Pat. No. 3,768,565. A number of these copolymers are available from Hercules Incorporated, Wilmington, Del.; for example, Hercules SPX-5024, a 90:10 acrylamide/AMPS® sodium salt copolymer; Hercules SPX-5022, an 80:20 acrylamide/AMPS® sodium salt copolymer; Hercules SPX-5023, a 50:50 acrylamide/AMPS® sodium salt copolymer; and Hercules SPX-5025, a 30:70 acrylamide/AMPS® sodium salt copolymer.

Another group of copolymers useful in the practice of the invention are the copolymers of acrylamide or methacrylamide with a monomer such as those which are the subject of U.S. Pat. No. 3,573,263, the disclosure of which is incorporated by reference in its entirety. These useful monomers include the well known commercially available material (acryloyloxyethyl) diethylmethyl ammonium methyl sulfate, commonly referred to as DEMMS and the commercially available material (methacryloyloxyethyl) trimethylammonium methylsulfate also known as MTMMS.

Copolymers of acrylamide with said DEMMS monomer are commercially available, for example, an 80:20 acrylamide/DEMMS copolymer. Copolymers of acrylamide with said MTMMS monomer are also commercially available, for example, Hercules Reten® 210, a 90:10 acrylamide/MTMMS copolymer; and Hercules Reten® 220, an 80:20 acrylamide/MTMMS copolymer.

A particularly preferred polymeric material for use in the second stage gel system of this invention is the class of high molecular weight vinyl lactum polymers and copolymers disclosed in U.S. Pat. No. 4,644,020, which is hereby incorporated herein in its entirety. An example of a commercially available copolymer of this type is Phillips HE-B® (now marketed as Phillips HE-300®), which is a copolymer of N-vinyl-2-pyrrolidone and acrylamide. This thermally stable, brine tolerant copolymer is available from Phillips Petroleum Company, Inc., of Bartlesville, Okla.

Another example of a polymer suitable for use in the second stage nonselective gel system of the present invention is Halliburton's K-Trol ® polymer, discussed in SPE/DOE paper 14958, entitled "In-Situ Polymerization Controls $CO_2$/Water Channeling at Lick Creek", presented at the Fifth SPE/DOE EOR Symposium at Tulsa, Okla. on Apr. 20–23, 1988. Hoechst V-2825 ® and V-3140 ® polymers are also useful polyacrylamides in which functional groups are incorporated during synthesis. These functional groups can be crosslinked with organic or transitional metal crosslinkers. The composition of the Hoechst polymers is discussed in U.S. Pat. No. 4,309,523, which is hereby incorporated by reference for those details. Experiments conducted with the above polymers indicate that they contain at least one of the functional groups, i.e., $NH_2$, $-CONH_2$, $-OH$, or $-SH$ which crosslink with organic and transitional metal crosslinkers mentioned herein to form a gel.

In the practice of this invention, to crosslink the polymer used in the nonselective in-situ forming gel system, a pre-formed phenolic resin can be used; such a resin is generally obtained by the condensation of phenol or substituted phenols with an aldehyde such as formaldehyde, acetaldehyde and furfural. Additionally, the phenol and aldehyde constituents can be added separately to produce the compositions of this invention, rather than being added as pre-formed phenolic resin.

Any suitable water-dispersible phenol can be used in the practice of this invention. Phenolic compounds suitable for use in the present invention include phenol, resorcinol, catechol, 4,4'-diphenol, 1,3-dihydroxynaphthalene, pyrogallol, phloroglucinol and other similar compounds. Resorcinol and phenol are the preferred phenolics for most water and carbon dioxide drive applications, with phenol being particularly preferred. The choice of a phenol compound will be based largely on the rate of gelation desired. Mixtures of the named phenols are also useful.

A broad range of water-dispersible aldehydes are useful as a constituent of the phenolic crosslinking agent in the practice of the present invention. It is known that both aliphatic and aromatic monoaldehydes and dialdehydes can be used. The useful aliphatic monoaldehydes include those containing from one to ten carbon atoms per molecule, such as formaldehyde, paraformaldehyde, acetaldehyde, proprionaldehyde, butylaldehyde, isobutylaldehyde, heptaldehyde and others. Among the useful dialdehydes are glyoxal, glutaraldehyde and terephthaldehyde. Mixtures of the various, aforementioned aldehydes are also useful in the practice of the present invention. Of the preferred aldehyde compounds, formaldehyde is particularly preferred.

The amount of phenolic resin or aldehyde and phenol mixture used in the second stage in-situ gel system of this invention will generally be a small but effective amount sufficient to initiate and cause gelation of an aqueous solution of the selected nonselective polymer. It will generally be found that the amount of phenolic resin useful to form advantageous gels will be in the range of 0.02 to 5.0 weight percent. When preformed resin is not employed, the amount of the phenol compound used will be in the range of 0.01 to about 2.0 weight percent, with concentrations of 0.05 to 1.0 weight percent preferred. The concentration of aldehyde used will be in the range of 0.01 to 3.0 weight percent, with concentrations of 0.1 to 1.0 weight percent preferred.

Also, an aminoplast or amino resin can be employed as the crosslinking agent for the nonselective polymer. Aminoplast resins form a class of thermosetting resins produced by the reaction of an amine with an aldehyde. Preferred aminoplast resins include melamine formaldehyde resins which are formed as a reaction product of melamine and formaldehyde. When an aminoplast resin is employed as the crosslinking agent for the nonselective polymer, the preferred polymer for utilization is one having at least one functional group selected from a member of the group consisting of an amine, an amide, a hydroxyl, or a thiol. An aminoplast resin utilized should contain a methylol group and its alkylated varieties which are reactive to such a polymer. Aminoplast resins can be reacted with a crosslinkable polymer in an aqueous medium under substantially all pH conditions, needing no catalyst. This reaction can be carried out at ambient conditions, and also under conditions occurring in a subterranean hydrocarbonaceous formation.

Methylated melamine formaldehyde resins derived as a reaction product of melamine and formaldehyde may also be used to crosslink the polymers preferred for use in the gel system of the present invention. Such resins have a molar ratio of between 1–6. A ratio of 3–6 is commonly found in commercial resins. The methylol group, $-CH_2OH$ and its methylated varieties are reactive to various functional groups such as $NH_2$, $-CONH_2$, $-OH$, $-SH$ and can also self-condense to form cured resins. The preparation of these resins is convenient and well documented in preparative polymer manuals.

The melamine resin that is utilized in this invention can be a commercial product such as American Cyanamid's Parez ® resins. Included among these melamine formaldehyde resins which are useful in this invention are the partially methylated resins and the hexamethoxymethyl resins (i.e. American Cyanamid's Parez, Cymel ®373, Cymel ®370, Cymel ®303, and Cymel ®380). The resin, however, has to be one that is soluble or dispersible in an aqueous medium. Other amino resins can also be used. Non-limiting examples are urea-formaldehyde, ethylene and propylene urea formaldehyde, triazone, uron, and glyoxal resins. Preferred polymer concentrations are from about 0.2 to about 5.0 wt. percent. Amino resins are useful crosslinkers because they (1) are economical to use; (2) can be applied to a wide variety of polymers; (3) form thermally stable, brine tolerant gels; and (4) do not need an acid or base catalyst.

A typical formulation for the preferred selective ex-situ-forming crosslinked heteropolysaccharide gel consists of about 2000 ppm of the Xanthomonas campestris NCIB 11854-based heteropolysaccharide, and about 100 ppm $Cr^{+3}$. As indicated above, such a heteropolysaccharide is prepared by growing Xanthomonas campestris NCIB 11854 in an aqueous nutrient medium by aerobic fermentation and recovering the heteropolysaccharide. The heteropolysaccharide is marketed by the Shell International Chemical Company of London, U.K., under the tradename of Shellflo ® XA. The above-described formulation forms a gel in about four hours, although gelation starts soon after addition of $Cr^{+3}$. The selective first-stage gel is capable of being injected into a formation because it is shear thinning and rehealing. Were the gel not preformed prior to injection, the solution could block the low permeability regions which have not been fully swept by a drive fluid. Should this occur, decreased fluid drive injectivity would occur which would reduce oil recovery. The Xanthomonas campestris NCIB 11854-based heteropolysaccharide-Cr gel is reasonably firm with a consistency like that of a gelatin. Due to gel instability at higher temperatures, the useful temperature limit for these first-stage gels is about 140°-150° F.

The nonselective gel system, as can be appreciated by those skilled in the art, may be selected so that they are reasonably unaffected by high saline concentrations and high temperatures often encountered in oil reservoirs. It should be noted that carbonate, bicarbonate, and sulfate anions encountered in oil reservoirs which are known to affect certain metal crosslinked gels have been found not to affect organically crosslinked nonselective gels. Nonselective gels can be formed under all pH conditions and are particularly useful in pH conditions of 10 or less. Polymerization retarders can be added to delay gelation so that the nonselective polymer can penetrate the formation to the desired distance. The second stage gel, when formed, can be formulated to be extremely rigid, undergoing substantially no syneresis. The preferred nonselective gel systems are useful in reservoirs having temperatures above 140° F., temperatures where conventional heteropolysaccharide gels are not recommended.

Polymers mentioned in U.S. Pat. No. 4,157,322 may also be utilized in the formulation of the second stage gel system. Polymer concentrations will generally range from about 0.1 to about 5.0 wt. percent depending upon the molecular weight of polymer used. Lower molecular weight polymers require a higher polymer concentration to gel. A polymer concentration of about 0.2-5.0 wt. percent is preferred. Use of the method of the present invention produces high integrity polymer gels able to withstand high temperatures and high salinity conditions often found in subterranean hydrocarbonaceous formations.

When utilized in the field for profile control purposes, the gelation rate of a system will depend on the amount of the components and the temperature at which the reaction is conducted. Thus, one can tailor the gel rate and the gel strength of the system by adjusting the amount of polymer, the crosslinker, the initiator, the polymerization retarder, pH, and temperature. The higher the temperature at given concentrations of crosslinker and polymer, the faster the gelation time. If a thicker gelled composition is desired, the polymer and crosslinker concentrations may be increased for a given temperature.

In preparing the gel system for utilization herein, the aqueous solution can comprise fresh water, brackish water, sea water, produced formation waters and mixtures thereof. A brine solution comprising sodium chloride in about 1 wt. % to 20 wt. %, preferably about 7.0 wt. % can be utilized. Xanthomonas campestris NCIB 11854-based heteropolysaccharide can be used in an amount of from about 1000 to about 5000 ppm. Chromic ions utilized should be from about 30 to about 300 ppm. Other polyvalent metal ions which can be utilized include aluminum, boron and iron. Alkali metal hydroxides which can be utilized include sodium and potassium hydroxide. Sodium hydroxide is preferred. The amount of alkali or alkaline earth metal hydroxide utilized should be from about 10 to about 1000 ppm, preferably about 100 ppm. A method for making a xanthan gel crosslinked with transitional metal ions, and an alkali or alkaline earth metal hydroxide is disclosed in U.S. Pat. No. 4,782,901. This patent is incorporated by reference herein. The nonselective gel can be comprised of polymer concentrations of from about 0.2 to about 5.0 wt. percent of the above mentioned crosslinkable polymer having the designated functional group. The partially methylated aminoplast resin which crosslinks with the polymer should be in an amount of from about 0.02 to about 50.0 wt. percent.

The invention is further illustrated by the following non-limiting examples.

EXAMPLES 1-7

Experiments were done in two stages. In the first stage, the polymers and crosslinkers were mixed together and allowed to stand at room temperature for four hours to simulate preparing a selective gel ex-situ. If a gel formed, then in the second stage the gel was sheared for 30 seconds in a Waring blender, sealed in ampules and aged at various temperatures to simulate pumping the profile control treatment into a reservoir and shutting it in to reform a gel. It was then observed to determine whether, at the various aging temperatures, the stage two gel formed. A good profile control candidate system will form a firm stage one gel, and forms a gel again in stage two, showing little syneresis during aging.

In the following examples, the stage one gel disappears upon shearing and the stage two gel forms over a period of time of less than a day to several weeks, depending upon pH and temperature. The stage one gel is formed using a Xanthomonas campestris-based heteropolysaccharide and a crosslinking agent for the heteropolysaccharide. In each example, this gel sheared to a fluid which easily poured. Ampules of these thin fluids were then aged in ovens at 210°, 230° and 250° F.

Formulations utilizing a heteropolysaccharide which is commercially available and produced by fermentation of glucose with the bacterium Xanthomonas campestris NRRL B-1459 (U.S. Department of Agriculture), were evaluated at 11 pH values over a range of 3 to 10. This particular heteropolysaccharide is produced by culturing the bacterium Xanthomonas campestris NRRL B-1459 in a well aerated medium having a pH of about 7 which contains commercial glucose, organic nitrogen sources, dipotassium hydrogen phosphate and appropriate trace elements. This polymer is available from the Pfizer Chemical Company under the tradename "Flocon" and from other commercial sources. Flocon ®4800 was used in the examples which follow. Formulations utilizing the preferred Xanthomonas campestris NCIB 11854-based heteropolysaccharide, commercially available from Shell International Chemical Company of London, U.K. under the tradename "Shellflo ® XA", were evaluated at 9 pH values over a range of 3 to 11.

EXAMPLE 1

The potential for these systems in high temperature waterflooding is demonstrated in the following example. A sample containing Xanthomonas campestris NRRL B-1459-based heteropolysaccharide (2000 ppm, Flocon ®4800), Phillips HE-B ® (5000 ppm), phenol (1010 ppm), formaldehyde (1870 ppm, 37% solution), and $CrCl_3.6H_2O$ (100 ppm) in synthetic sea water was mixed and its pH adjusted to 6.2 with sodium hydroxide (1N). This sample gelled in about 4 hours, typical of Xanthan/Cr gels. The gel was sheared in a Waring blender for 30 seconds to a non-viscous foam. This system was sealed in ampules and aged at 210° F. and at 230° F. in ovens. After three weeks these samples had gelled to deformable but elastic gels which looked like typical HE-B ®/phenol/formaldehyde gels.

TABLE I

EFFECT OF pH AND TEMPERATURE ON GELATION

| Ex. | Composition (ppm Component) | pH | Stage 1 Gel Time | Aging Temp °F. | Stage 2 Gel Time |
|---|---|---|---|---|---|
| 1.1 | 2000 Flocan ® 5000 HE-B ® 100 Cr 1010 Phenol 1870 HCHO | 6.2 | 4 Hours | 210 | Gel Formed After 3 Weeks |
| 1.2 | 2000 Flocon ® 5000 HE-B ® 100 Cr 1010 Phenol 1870 HCHO | 6.2 | 4 Hours | 230 | Gel Formed After 3 Weeks |

EXAMPLE 2

This example demonstrates the limited pH range over which Xanthomonas campestris NRRL B-1459-based heteropolysaccharide formulations gel. When samples were prepared as in Example 1, with the exception that the pH was adjusted to 7.05, 8.79 and 10.18, none of these formulations formed stage one gels at room temperature within 4 hours.

TABLE II

EFFECT OF pH AND TEMPERATURE ON GELATION

| Ex. | Composition (ppm Component) | pH | Stage 1 Gel Time | Aging Temp °F. | Stage 2 Gel Time |
|---|---|---|---|---|---|
| 2.1 | 2000 Flocon ®<br>5000 HE-B ®<br>100 Cr<br>1010 Phenol<br>1870 HCHO | 7.05 | No Gel After 4 Hours | 210 | — |
| 2.2 | 2000 Flocon ®<br>5000 HE-B ®<br>100 Cr<br>1010 Phenol<br>1870 HCHO | 8.79 | No Gel After 4 Hours | 230 | — |
| 2.3 | 2000 Flocon ®<br>5000 HE-B ®<br>100 Cr<br>1010 Phenol<br>1870 HCHO | 10.18 | No Gel After 4 Hours | 250 | — |

EXAMPLE 3

This example demonstrates that Cr-crosslinked Xanthomonas campestris NRRL B-1459-based heteropolysaccharide gel formulations may perform poorly at high temperatures. A portion of the sample prepared in Example 1 was aged at 250° F. These gel formulations exhibited excessive syneresis.

EXAMPLE 4

This example demonstrates that the formation of stage two gels can be pH and temperature dependent. Samples were prepared as described in Example 1, with the exception that aqueous HCl was added to adjust them to various pH values over the range of from 3-5. Aging was conducted at 210° F., 230° F. and 250° F. Test data obtained are presented in Table III, below.

TABLE III

EFFECT OF pH AND TEMPERATURE ON GELATION

| Ex. | Composition (ppm Component) | pH | Stage 1 Gel Time | Aging Temp °F. | Stage 2 Gel Time |
|---|---|---|---|---|---|
| 4.1 | 2000 Flocon ®<br>5000 HE-B ®<br>100 Cr<br>1010 Phenol<br>1870 HCHO | 3.07 | 4 Hours | 210 | No Gel After 1 Month |
| 4.2 | 2000 Flocon ®<br>5000 HE-B ®<br>100 Cr<br>1010 Phenol<br>1870 HCHO | 3.07 | 4 Hours | 230 | No Gel After 1 Month |
| 4.3 | 2000 Flocon ®<br>5000 HE-B ®<br>100 Cr<br>1010 Phenol<br>1870 HCHO | 3.07 | 4 Hours | 250 | No Gel After 1 Month |
| 4.4 | 2000 Flocon ®<br>5000 HE-B ®<br>100 Cr<br>1010 Phenol<br>1870 HCHO | 4.18 | 4 Hours | 210 | No Gel After 1 Month |
| 4.5 | 2000 Flocon ®<br>5000 HE-B ®<br>100 Cr<br>1010 Phenol<br>1870 HCHO | 4.18 | 4 Hours | 230 | No Gel After 1 Month |
| 4.6 | 2000 Flocon ®<br>5000 HE-B ®<br>100 Cr<br>1010 Phenol<br>1870 HCHO | 4.18 | 4 Hours | 250 | Gel Formed After 11 Days |
| 4.7 | 2000 Flocon ®<br>5000 HE-B ®<br>100 Cr<br>1010 Phenol<br>1870 HCHO | 5.10 | 4 Hours | 210 | Gel Formed After 1 Month |
| 4.8 | 2000 Flocon ®<br>5000 HE-B ®<br>100 Cr<br>1010 Phenol<br>1870 HCHO | 5.10 | 4 Hours | 230 | Gel Formed After 1 Month |
| 4.9 | 2000 Flocon ®<br>5000 HE-B ®<br>100 Cr<br>1010 Phenol<br>1870 HCHO | 5.10 | 4 Hours | 250 | Gel Formed After 11 Days |

EXAMPLE 5

This example demonstrates that gel formations containing a Xanthomonas campestris NCIB 11854-based heteropolysaccharide, rather than a Xanthomonas campestris NRRL B-1459-based heteropolysaccharide, unexpectedly, form stage one gels over a broader range of pH values. When samples were made in accordance with the formulations of Example 2, with the exception of the substitution of the Xanthomonas campestris NCIB 11854-based heteropolysaccharide, Shellflo ® XA, rather than the Xanthomonas campestris NRRL B-1459-based heteropolysaccharide, Flocon ® 4800, and the samples were adjusted to various values of pH over the range of from 6.6 to 10.53, all formed stage one gels, although the stage one gels having a pH of 7.11 and 7.45 were observed to be looser and less homogeneous than the others. All samples formed good stage two gels in a period of one day to about one week at all temperatures between 210° F. to 250° F.

TABLE IV

EFFECT OF pH AND TEMPERATURE ON GELATION

| Ex. | Composition (ppm Component) | pH | Stage 1 Gel Time | Aging Temp °F. | Stage 2 Gel Time |
|---|---|---|---|---|---|
| 5.1 | 2000 Shellflo XA ®<br>5000 HE-B ®<br>100 Cr | 6.62 | 4 Hours | 210 | Weak Gel Formed In 1 Day |

TABLE IV-continued
EFFECT OF pH AND TEMPERATURE ON GELATION

| Ex. | Composition (ppm Component) | pH | Stage 1 Gel Time | Aging Temp °F. | Stage 2 Gel Time |
|---|---|---|---|---|---|
| 5.2 | 2000 Shellflo XA ® 5000 HE-B ® 100 Cr 1010 Phenol 1870 HCHO | 6.62 | 4 Hours | 230 | Weak Gel Formed In 1 Hour |
| 5.3 | 2000 Shellflo XA ® 5000 HE-B ® 100 Cr 1010 Phenol 1870 HCHO | 6.62 | 4 hours | 250 | Weak Gel Formed In 1 Hour |
| 5.4 | 2000 Shellflo XA ® 5000 HE-B ® 100 Cr 1010 Phenol 1870 HCHO | 7.45 | 4 hours | 210 | Slight Gel In 2 Days; Loose Gel In 3 Days |
| 5.5 | 2000 Shellflo XA ® 5000 HE-B ® 100 Cr 1010 Phenol 1870 HCHO | 7.45 | 4 hours | 230 | Loose Gel In 1 Day; Stronger Gel In 7 Days |
| 5.6 | 2000 Shellflo XA ® 5000 HE-B ® 100 Cr 1010 Phenol 1870 HCHO | 7.45 | 4 hours | 250 | Loose Gel In 1 Day; Stronger Gel In 7 Days |
| 5.7 | 2000 Shellflo XA ® 5000 HE-B ® 100 Cr 1010 Phenol 1870 HCHO | 8.43 | 4 hours | 210 | Very Loose Gel - 1 Day; Stronger Gel In 5 Days |
| 5.8 | 2000 Shellflo XA ® 5000 HE-B ® 100 Cr 1010 Phenol 1870 HCHO | 8.43 | 4 hours | 230 | Very Loose Gel - 1 Day; Stronger Gel In 3 Days |
| 5.9 | 2000 Shellflo XA ® 5000 HE-B ® 100 Cr 1010 Phenol 1870 HCHO | 8.43 | 4 hours | 250 | Very Loose Gel - 1 Day; Stronger Gel In 2 Days |
| 5.10 | 2000 Shellflo XA ® 5000 HE-B ® 100 Cr 1010 Phenol 1870 HCHO | 9.69 | 4 hours | 210 | Strong gel In 4 Days |
| 5.11 | 2000 Shellflo XA ® 5000 HE-B ® 100 Cr 1010 Phenol 1870 HCHO | 9.69 | 4 hours | 230 | Loose Gel In 1 Day; Stronger Gel In 4 Days |
| 5.12 | 2000 Shellflo XA ® 5000 HE-B ® 100 Cr 1010 Phenol 1870 HCHO | 9.69 | 4 hours | 250 | Strong Gel In 1 Day |
| 5.13 | 2000 Shellflo XA ® 5000 HE-B ® 100 Cr 1010 Phenol 1870 HCHO | 10.53 | 4 hours | 210 | Strong Gel In 1 Day |
| 5.14 | 2000 Shellflo XA ® 5000 HE-B ® 100 Cr 1010 Phenol 1870 HCHO | 10.53 | 4 hours | 230 | Strong Gel In 1 Day |
| 5.15 | 2000 Shellflo XA ® 5000 HE-B ® 100 Cr 1010 Phenol 1870 HCHO | 10.53 | 4 hours | 250 | Strong Gel In 1 Day |

EXAMPLE 6

This example demonstrates that the formulation of stage two gels with a Xanthomonas campestris NCIB 11854-based heteropolysaccharide can also be pH and temperature dependent. A sample was prepared as described in Example 5, with the exception that the pH was adjusted to a value of 6.58. Upon aging at 250° F. the stage two gel formed after a period of about two weeks. At 230° F., the stage two gel formed after a period of about one month. At 210° F., no stage two gel formed, even after a month of aging.

TABLE V
EFFECT OF pH AND TEMPERATURE ON GELATION

| Ex. | Composition (ppm Component) | pH | Stage 1 Gel Time | Aging Temp °F. | Stage 2 Gel Time |
|---|---|---|---|---|---|
| 6.1 | 2000 Shellflo XA ® 5000 HE-B ® 100 Cr 1010 Phenol 1870 HCHO | 6.58 | 4 Hours | 210 | No Gel Formed After 1 Month |
| 6.2 | 2000 Shellflo XA ® 5000 HE-B ® 100 Cr 1010 Phenol 1870 HCHO | 6.58 | 4 Hours | 230 | Gel Formed At 1 Month |
| 6.3 | 2000 Shellflo XA ® 5000 HE-B ® 100 Cr 1010 Phenol 1870 HCHO | 6.58 | 4 hours | 250 | Gel Formed At 2 Weeks |

EXAMPLE 7

This example illustrates a variety of second stage gel systems useful in the formulation of the gel systems of the present invention. The nonselective gel systems shown below may be substituted for the phenol-formaldehyde-crosslinked gel system, above, which employed the Phillips HE-B ® polymer.

Nonselective gels were formed in a 30 wt. % brine solution containing about 1500 ppm Ca(II) and about 500 ppm Mg(II). The gels so formed were stable as determined by sustained gel integrity and low gel shrinkage at a temperature of at least about 195° F. for at least three months. Examples of preferred nonselective gel compositions are set forth below.

TABLE VI
EXAMPLES OF NONSELECTIVE GELS

Gelation with Melamine-Formaldehyde Crosslinker

| Example | Polymer | 30% Brine[8] | Deionized Water | Parez 613[1] |
|---|---|---|---|---|
| | 10% AMPVA[2] | | | |
| 7.1 | 5 g | 5 g | 0 | 0.4 g |
| 7.2 | 2.5 g | 5 g | 2.5 g | 0.4 g |
| | AMPS ®-AMPVA[3] 10% | | | |
| 7.3 | 2.5 g | 5 g | 2.5 g | 0.4 g |
| 7.4 | 5 g | 5 g | 0 | 0.4 g |
| | PVA[4] 5% | | | |
| 7.5 | 5 g | 2.5 g | 2.5 g | 0.4 g |
| | AMPS ®-PVA[5] 10% | | | |
| 7.6 | 5 g | 2.5 g | 2.5 g | 0.4 g |
| | Magnifloc ®[6] 1% | | | |
| 7.7 | 5 g | 5 g | 0 | 0.4 g |
| 7.8 | 5 g | 2.5 g | 2.5 g | 0.4 g |
| | AM-AMPS ®[7] 1% | | | |
| 7.9 | 5 g | 5 g | 0 | 0.4 g |
| 7.10 | 2.5 g | 5 g | 2.5 g | 0.4 g |

Gelation with Trimethylolmelamine (TM)

TABLE VI-continued

EXAMPLES OF NONSELECTIVE GELS

| Example | Polymer | 30% Brine[8] | Deionized Water | TM |
|---|---|---|---|---|
| | HE-B ® 2%[9] | | | |
| 7.11 | 2.5 g | 5 g | 2.5 g | 0.4 g |
| 7.12 | 2.5 g | 5 g | 2.5 g | 0.4 g |
| | HE-E ® 2% | | | |
| 7.13 | 2.5 g | 5 g | 2.5 g | 0.4 g |
| 7.14 | 2.5 g | 5 g | 2.5 g | 0.2 g |

[1] A commercial 80% active amino resin obtainable from American Cyanamid.
[2] Acrylamide modified polyvinyl alcohol.
[3] Acrylamido-2-methyl-propanesulfonate/acrylamide modified polyvinyl alcohol.
[4] Polyvinyl alcohol.
[5] Acrylamido-2-methyl-propanesulfonate/polyvinyl alcohol.
[6] Polyacrylamide obtained from American Cyanamid.
[7] Poly (acrylamide-co-acrylamido-2-methyl-propanesulfonate).
[8] 30% NaCl, 2000 ppm Ca, 1000 ppm Mg.
[9] Phillips HE ® polymer.

Considerable latitude exists in the design of field processes employing polymeric slugs containing both selective and nonselective polymers. For example, to minimize any damage to the low permeability zones from the nonselective polymer during the initial stages of injection, the concentration of this component in the slug can be lowered until such time as the selective polymer has effectively isolated the low permeability zones from further invasion of fluid via filter cake formation. This is a preferred embodiment of the invention where the permeability contrast between zones is not large. In another example, a Xanthomonas campestris NCIB 11854 heteropolysaccharide-based/Cr gel can be used to selectively deliver a brine tolerant polyacrylamide (such as Phillips HE-B ® or Hoechst V-3140 ® polymer) with organic crosslinker, e.g., phenol/formaldehyde, to the more permeable zones in hot reservoirs like the North Sea. Here, high temperature will degrade the Xanthan/Cr gel within a few days, but the second stage system will gel with phenol/formaldehyde to maintain reduced permeability at reservoir temperature and salinity.

Where it is desired to obtain increased sweep efficiency, gels of this invention can be used to plug a previously swept portion of a formation. The gels can be directed to areas of increased permeability by utilization in any of the below methods.

One method where gels of this invention can be utilized is during a waterflooding process for the recovery of oil from a subterranean formation. After plugging the more permeable zones of a reservoir with the novel gels of this invention, a waterflooding process can be commenced. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a cyclic carbon dioxide steam stimulation in a heavy oil recovery process to obtain greater sweep efficiency. Cyclic carbon dioxide steam stimulation can be commenced after plugging the more permeable zones of the reservoir with the novel gels of this invention. A suitable process is described in U.S. Pat. No. 4,565,249 which issued to Pebdani et al. This patent is hereby incorporated by reference in its entirety Increased sweep efficiency can be obtained when the subject gels are used in combination with a carbon dioxide process by lowering the carbon dioxide minimum miscibility pressure ("MMP") and recovering oil. Prior to commencement of the carbon dioxide process, the more permeable zones are plugged with these novel gels. Carbon dioxide MMP in an oil recovery process is described in U.S. Pat. No. 4,513,821 issued to Shu which is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for imparting selectivity to an in-situ gel-forming composition for placement within a subterranean oil-bearing formation having relatively high permeability zones and relatively low permeability zones, comprising the steps of:
   a) preparing an aqueous-based mixture comprising:
      (i) a first stage gel-forming composition in an amount effective to selectively enter the relatively high permeability zones of the formation, the first stage composition including a heteropolysaccharide prepared by growing Xanthomonas campestris NCIB 11854 in an aqueous nutrient medium by aerobic fermentation and recovering the heteropolysaccharide and a crosslinking agent for the heteropolysaccharide; and
      (ii) at least one second stage in-situ gel-forming composition comprising a water-dispersible polymer and a crosslinking agent for the water-dispersible polymer in an amount effective to form a stable gel; and
   b) gelling the first stage gel-forming composition exsitu by reacting the Xanthomonas campestris NCIB 1185 heteropolysaccharide with the crosslinking agent for the heteropolysaccharide;
   wherein the mixture exhibits greater selectivity than would a like mixture in the absence of the first stage selective gel-forming composition.

2. The method of claim 1, wherein said crosslinking agent for the water-dispersible polymer is selected from a member of the group consisting of melamine-formaldehyde, urea formaldehyde, ethylene urea formaldehyde, propylene urea formaldehyde, triazone, uron, glyoxal and mixtures thereof.

3. The method of claim 1, wherein said crosslinking agent for the water-dispersible polymer is selected from a member of the group consisting of phenolic resins and mixtures of a phenolic component and an aldehyde.

4. The method of claim 3, wherein said phenolic mixture comprises about 1 to 99 weight percent of at least one phenolic compound selected from the group consisting of phenol, resorcinol, catechol, phloroglucinol, pyrogallol, 4,4'-diphenol and 1,3-dihydroxynaphthaline; and about 1 to about 99 weight percent of at least one aldehyde component selected from the group consisting of aliphatic monoaldehydes, aromatic monoaldehydes, aliphatic dialdehydes and aromatic dialdehydes.

5. The method of claim 4, wherein said phenolic compound is phenol and said aldehyde component is formaldehyde.

6. The method of claim 5, wherein said phenol and said formaldehyde are present in a molar ratio of about 1 to 6.

7. The method of claim 6, wherein said polymer is a member selected from the group consisting of polyacrylamides, polyvinyl alcohols, poly(acrylamide-co-acrylamido-2-methylpropanesulfonate), copolymers of N-vinyl-2-pyrrolidone and acrylamide and acrylamide modified polyvinyl alcohols.

8. The method of claim 1, wherein said polymer is a member selected from the group consisting of polyacrylamides, polyvinyl alcohols, poly(acrylamide-co-acrylamido-2-methylpropanesulfonate), copolymers of N-vinyl-2-pyrrolidone and acrylamide and acrylamide modified polyvinyl alcohols.

9. The method of claim 1, wherein the ratio of polymer to said crosslinking agent for said polymer is from about 10:1 to about 1:10.

10. The method of claim 1, wherein a polymerization retarder is placed into said aqueous solution so as to allow propagation to a desired distance into said high permeability zone.

11. The method of claim 1, wherein said mixture preparing step further includes the step of adjusting the pH of the mixture to a level which assures the gelation of the second stage composition.

12. A process for enhancing the amount of oil recovered from a subterranean oil-bearing formation having relatively high permeability zones and relatively low permeability zones penetrated by at least one injection well and at least one production well by selectively plugging at least a portion of the relatively high permeability zones with a profile control gel, comprising the steps of:
   a) preparing an aqueous-based mixture comprising:
      (i) a first stage gel-forming composition in an amount effective to selectively enter the relatively high permeability zones of the formation, the first stage composition including a heteropolysaccharide prepared by growing Xanthomonas campestris NCIB 11854 in an aqueous nutrient medium by aerobic fermentation and recovering the heteropolysaccharide and a crosslinking agent for the heteropolysaccharide; and
      (ii) at least one second stage in-situ gel-forming composition comprising a water-dispersible polymer and a crosslinking agent for the water-dispersible polymer in an amount effective to form a stable gel; and
   b) gelling the first stage gel-forming composition exsitu by reacting the Xanthomonas campestris NCIB 11854 heteropolysaccharide with the crosslinking agent for the heteropolysaccharide;
   c) injecting the aqueous-based mixture of step (b) into the relatively high permeability zones within the formation;
   d) gelling the second stage in-situ gel-forming composition viscous liquid by reacting the polymer with the crosslinking agent;
   f) injecting a flooding fluid into the relatively low permeability zones of the formation via the injection well; and
   g) recovering fluids including oil from the formation via the production well.

13. The process of claim 12, wherein said crosslinking agent for the water-dispersible polymer is selected from a member of the group consisting of melamine-formaldehyde, urea formaldehyde, ethylene urea formaldehyde, propylene urea formaldehyde, triazone, uron, glyoxal and mixtures thereof.

14. The process of claim 12, wherein said crosslinking agent for the water-dispersible polymer is selected from a member of the group consisting of phenolic resins and mixtures of a phenolic component and an aldehyde.

15. The process of claim 14, wherein said phenolic mixture comprises about 1 to 99 weight percent of at least one phenolic compound selected from the group consisting of phenol, resorcinol, catechol, phloroglucinol, pyrogallol, 4,4'-diphenol and 1,3-dihydroxynaphthaline; and about 1 to about 99 weight percent of at least one aldehyde component selected from the group consisting of aliphatic monoaldehydes, aromatic monoaldehydes, aliphatic dialdehydes and aromatic dialdehydes.

16. The process of claim 15, wherein said phenolic compound is phenol and said aldehyde component is formaldehyde.

17. The process of claim 16, wherein said phenol and said formaldehyde are present in a molar ratio of about 1 to 6.

18. The process of claim 17, wherein said polymer is a member selected from the group consisting of polyacrylamides, polyvinyl alcohols, poly(acrylamide-co-acrylamido-2-methylpropanesulfonate), copolymers of N-vinyl-2-pyrrolidone and acrylamide and acrylamide modified polyvinyl alcohols.

19. The process of claim 12, wherein said polymer is a member selected from the group consisting of polyacrylamides, polyvinyl alcohols, poly(acrylamide-co-acrylamido-2-methylpropanesulfonate), copolymers of N-vinyl-2-pyrrolidone and acrylamide and acrylamide modified polyvinyl alcohols.

20. The process of claim 12, wherein said mixture preparing step further includes the step of adjusting the pH of the mixture to a level which assures the gelation of the second stage composition.

* * * * *